Sept. 9, 1924.                                                              1,508,264
A. L. ARMENTROUT
PISTON STRUCTURE
Filed July 2, 1923
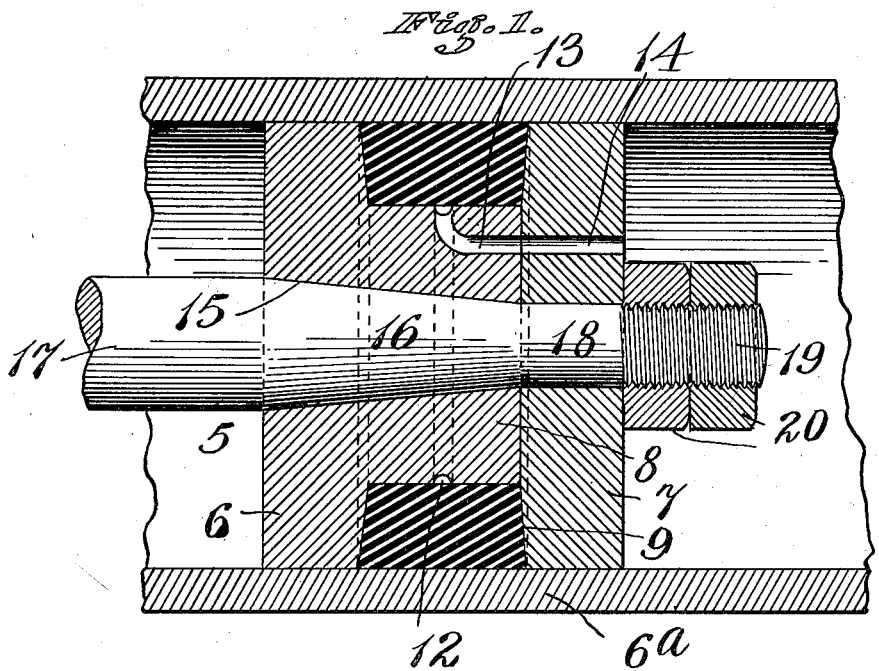
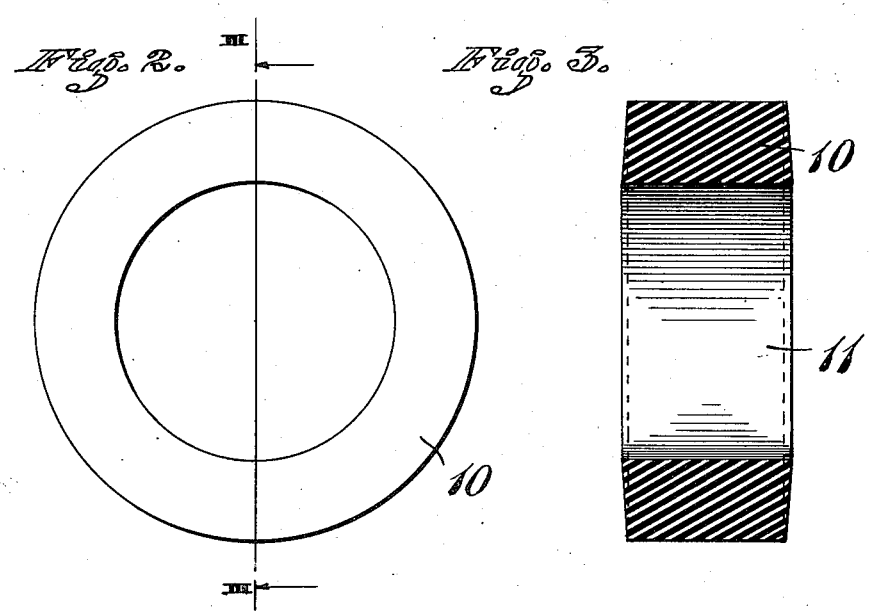
INVENTOR.
A. L. ARMENTROUT
BY
ATTORNEYS Patented Sept. 9, 1924.

1,508,264

UNITED STATES PATENT OFFICE.

ARTHUR LEON ARMENTROUT, OF WHITTIER, CALIFORNIA, ASSIGNOR OF ONE-HALF TO THE GUIBERSON CORPORATION, OF DALLAS, TEXAS, A CORPORATION OF DELAWARE.

PISTON STRUCTURE.

Application filed July 2, 1923. Serial No. 649,133.

*To all whom it may concern:*

Be it known that I, ARTHUR LEON ARMENTROUT, a citizen of the United States, and a resident of Whittier, county of Los Angeles, and State of California, have invented a new and useful Piston Structure, of which the following is a specification.

This invention relates to piston structures and is particularly, but not necessarily, directed to pistons for use in connection with slush pumps or the like and the essential feature of the invention resides in the provision of a piston structure having a self-expanding packing sleeve formed of such material and designed to constantly establish a tight or effective joint between the piston body and its mating cylinder, whereby to positively prevent leakage between these parts.

A further object of the invention is to provide a structure of this character embodying a piston head and a seamless or continuous co-acting elastic packing sleeve, the latter and the former being mutually designed whereby the sleeve acts at all times to automatically assume an expanded condition so as to cause the sleeve to always freely compensate itself to wear and snugly fit the cylinder as the piston reciprocates therein.

A further object of the invention is to provide a structure of this character wherein slush pumps or the like may be operated with a material saving in their maintenance, or cost or up-keep, and wherein the sealed connection between the piston and cylinder walls will be of maximum efficiency, rendering it unnecessary to repair the piston at such frequent intervals as experienced heretofore, while greatly adding to the life of the packing sleeve.

In the drawings:

Figure 1 is a vertical longitudinal section through the cylinder of the slush pump showing the application of the invention thereto.

Figure 2 is a view in side elevation of the sleeve.

Figure 3 is a section on line III—III of Figure 2.

In carrying the invention into practise I employ a piston (5) adapted to reciprocate in the cylinder (6ª) of a slush pump or the like.

The piston comprises a head including mating sections (6) and (7), the latter being in the form of a follower for a purpose to be hereinafter described. The section (6) is of circular formation, likewise the section (7). Both of these sections occupy the approximate positions shown in Figure 1 so that they are free to slide with respect to the walls of the cylinder (6). The section (6) is provided with a cylindrical hub or extension (8) which is so related to the inner faces of the sections (6) and (7) as to define therewith an annular groove (9). The inner faces of the sections (6) and (7) are flared as clearly illustrated in Figure 1 so that the groove is of a gradually restricted width toward its inner end.

Arranged in the groove (9) is an elastic sleeve (10), the same having an opening (11) which accommodates the aforesaid hub (8). This sleeve has a maximum width slightly in excess of the length of the hub (8) and as shown in Figure 3 of the drawings, it is observed that the body of the ring or rim thereof is tapered so that its greatest width is at the innermost part of said body. In other words the flare of the ring is approximately the direct reversal of the flare of the groove (9). The purpose of this arrangement will appear as the description advances.

As stated the maximum width of the sleeve (11) is greater than the maximum width of said groove (9) and in consequence thereof one side of the sleeve, namely that adjacent to the follower section (7) extends for such distance beyond the hub (8) as to permit said follower section (7) to be advanced against said sleeve so as to sequeeze same or compress it in the groove. Due to the relative reversals of the flares of the groove (9) and sleeve (10) the latter tends to normally creep circumferentially beyond said groove where it is constantly and automatically advanced into effective sealing engagement with the internal walls of the piston cylinder. This renders the sleeve automatically compensating.

Due to its constant tendency to expand from the groove (9) it always accommodates itself to conditions of the cylinder walls so as to positively prevent premature leakage between the parts.

Due to the manner in which the sleeve functions in the groove as it is brought into frictional contact with the walls of the cylinder, it obviously follows that some means must be employed for breaking the suction under the sleeve and around the periphery of the hub (8). In order that this can be satisfactorily accomplished I provide the hub with an annular groove (12) having a branch (13) which opens to a vent passage (14) in the follower section (7). The vent opening (14) communicates with the cylinder so that liquid is permitted to enter the groove (12) and destroy the tendency toward an induced vacuum at this point. In this manner the parts automatically function satisfactorily as aforesaid.

The section (6) of the piston head is provided with a flared axial bore (15) which receives a correspondingly flared portion (16) of a piston rod (17). This rod has a cylindrical end (18) which freely passes through the center of the follower section (7) and beyond this section the rod is threaded at (19) for the accommodation of clamping and adjusting nuts (20). In this manner the nuts can be advanced against the follower section (7) and the latter, in turn, moved with sufficient force against one side of the sleeve (10), whereby to slightly distort same and crowd it into the groove (9).

I do not wish to limit myself as to the precise details of construction, the sizes and nature of materials employed herein, as these may be changed at will within the scope of the appended claims. I would state, however, that in practice I find rubber the most suitable material from which to construct the sleeve (10). In this respect a suitable well known composition of matter that is pliable may be employed in lieu of rubber.

I claim:

1. A piston structure comprising a head having a flared annular groove, and a flared elastic sleeve fitting said groove and coacting with the walls thereof so that the ring normally tends to move circumferentially beyond the walls of the head and into effective sealed engagement with the walls of a cylinder, the maximum width of the sleeve being contained in that portion of minimum width of said groove.

2. A piston structure comprising a sectional head wherein the sections thereof are movable axially with respect to each other, the said sections being spaced apart and formed with an annular groove, an elastic sleeve seated in said groove, and means for moving said sections relatively and against the sides of the sleeve to bulge the sleeve and cause its peripheral portion to extend beyond the groove and to expand the diameter of the sleeve to a point in excess of the greatest diameter of the head, and means for breaking an induced vacuum between the sleeve and the walls of the groove incident to friction created between the sleeve and the walls of a cylinder as the piston operates in said cylinder.

3. A piston head having an annular groove of a gradually decreasing width toward the center of the head, and a packing sleeve fitted in said groove and being of a gradually increasing width toward the center of the head.

ARTHUR LEON ARMENTROUT.